(12) United States Patent
Yin et al.

(10) Patent No.: US 12,386,112 B2
(45) Date of Patent: Aug. 12, 2025

(54) DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Zhiyuan Yin, Hubei (CN); Yongzhen Jia, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 695 days.

(21) Appl. No.: 17/764,190

(22) PCT Filed: Mar. 1, 2022

(86) PCT No.: PCT/CN2022/078642
§ 371 (c)(1),
(2) Date: Mar. 27, 2022

(87) PCT Pub. No.: WO2023/155243
PCT Pub. Date: Aug. 24, 2023

(65) Prior Publication Data
US 2023/0280517 A1    Sep. 7, 2023

(30) Foreign Application Priority Data
Feb. 17, 2022  (CN) .......................... 202210146886.5

(51) Int. Cl.
*G02B 5/30*  (2006.01)

(52) U.S. Cl.
CPC .................. *G02B 5/3083* (2013.01)

(58) Field of Classification Search
CPC .................................. G02B 5/3083
(Continued)

(56) References Cited

U.S. PATENT DOCUMENTS

2020/0286436 A1*  9/2020  Lim .................. G06F 3/041
2021/0223607 A1*  7/2021  Liu .................... G02B 1/11
(Continued)

FOREIGN PATENT DOCUMENTS

CN    103389536 A    11/2013
CN    110767105 A    2/2020
(Continued)

OTHER PUBLICATIONS

International Search Report in International application No. PCT/CN2022/078642, mailed on Aug. 1, 2022.
(Continued)

*Primary Examiner* — Ricky D Shafer
(74) *Attorney, Agent, or Firm* — Rivka Friedman

(57) ABSTRACT

A display device includes a display functional layer, a first phase retardation layer disposed on one side of the display functional layer in a light-emitting direction, a camera module disposed on one side of the display functional layer away from the light-emitting direction, and a second phase retardation layer disposed between the display functional layer and the camera module. A sum of a phase retardation value of the first phase retardation layer and a phase retardation value of the second phase retardation layer is greater than 8000 nm.

17 Claims, 3 Drawing Sheets

(58) Field of Classification Search
USPC .................................................. 359/489.07
See application file for complete search history.

(56) References Cited

U.S. PATENT DOCUMENTS

| | | | | |
|---|---|---|---|---|
| 2021/0311238 A1* | 10/2021 | Lee | .................... | G02F 1/133638 |
| 2022/0011489 A1* | 1/2022 | Kim | .................... | G06F 1/1637 |
| 2023/0180519 A1* | 6/2023 | Choi | .................... | H10K 50/868 |
| | | | | 257/40 |

FOREIGN PATENT DOCUMENTS

| | | | |
|---|---|---|---|
| CN | 110853507 | A | 2/2020 |
| CN | 111292613 | A | 6/2020 |
| CN | 112086025 | A | 12/2020 |
| CN | 112635539 | A | 4/2021 |
| CN | 112838112 | A | 5/2021 |
| CN | 113593414 | A | 11/2021 |
| CN | 113920866 | A | 1/2022 |
| JP | 2003114428 | A | 4/2003 |
| WO | 2012033354 | A2 | 3/2012 |

OTHER PUBLICATIONS

Written Opinion of the International Search Authority in International application No. PCT/CN2022/078642, malled on Aug. 1, 2022.
Chinese Office Action issued in corresponding Chinese Patent Application No. 202210146886.5 dated Apr. 29, 2024, pp. 1-10.

* cited by examiner

DISPLAY DEVICE

FIELD OF INVENTION

The present disclosure relates to the field of display technologies, and more particularly, to a display device.

BACKGROUND OF INVENTION

Camera Under Panel (CUP) technique is a main development direction of front camera techniques, which hides front lenses under screens. When taking a selfie, the screens above the front lenses turn into a transparent state, allowing sufficient light to enter. When not taking pictures, "transparent screens" can display images normally.

At present, since protective film layers on foldable screens are usually high phase retardation materials, incident natural light will have a phase change. In conjunction with polarization effects of polarizing layers of the screens and the lenses, it is easy to cause rainbow mura when taking pictures with the lenses.

Technical problem: current foldable screens have technical problems of rainbow mura when taking pictures with the lenses caused by phase retardation effect of the protective film layers on natural light and the polarization effects of the polarizing layers and the lenses.

SUMMARY OF INVENTION

The present disclosure provides a display device to solve technical problems of rainbow mura when taking pictures with under-screen lenses caused by factors of screen protective film layers, polarizing layers, and lenses in current display devices.

In order to solve the above technical problems, the present disclosure provides following technical solutions.

The present disclosure provides a display device, which includes:
  a display functional layer including a function add-on area and a main display area surrounding the function add-on area;
  a first phase retardation layer disposed on one side of the display functional layer in a light-emitting direction;
  a camera module disposed on one side of the display functional layer away from the light-emitting direction, wherein, the camera module corresponds to the function add-on area; and
  a second phase retardation layer disposed between the display functional layer and the camera module.

Wherein, the first phase retardation layer has a first phase retardation value, the second phase retardation layer has a second phase retardation value, and a sum of the first phase retardation value and the second phase retardation value is greater than 8000 nm.

The display device of the present disclosure further includes a substrate disposed on the side of the display functional layer away from the light-emitting direction.

In the display device of the present disclosure, the second phase retardation layer is disposed on the substrate.

In the display device of the present disclosure, an orthographic projection of the second phase retardation layer on the substrate coincides with the substrate.

In the display device of the present disclosure, an orthographic projection of the substrate on the second phase retardation layer coincides with the second phase retardation layer.

In the display device of the present disclosure, the second phase retardation layer corresponds to the function add-on area.

In the display device of the present disclosure, an orthographic projection of the function add-on area on the second phase retardation layer is within the second phase retardation layer.

In the display device of the present disclosure, the second phase retardation layer is disposed on the camera module.

In the display device of the present disclosure, an orthographic projection of the function add-on area on the second phase retardation layer is within the second phase retardation layer.

In the display device of the present disclosure, the substrate is provided with a first light-transmitting hole corresponding to the function add-on area.

In the display device of the present disclosure, an orthographic projection of the first light-transmitting hole on the display functional layer is within the function add-on area.

In the display device of the present disclosure, the second phase retardation layer is provided with a second light-transmitting hole corresponding to the first light-transmitting hole.

In the display device of the present disclosure, a central line of the second light-transmitting hole coincides with a central line of the first light-transmitting hole.

In the display device of the present disclosure, a diameter of the second light-transmitting hole is less than a diameter of the first light-transmitting hole.

In the display device of the present disclosure, the camera module includes a lens corresponding to the second light-transmitting hole.

In the display device of the present disclosure, a central line of the lens coincides with a central line of the second light-transmitting hole.

In the display device of the present disclosure, an included angle formed by a connecting line of a diameter of the second light-transmitting hole and a surface central point of the lens is greater than or equal to 90 degrees.

In the display device of the present disclosure, an included angle formed by a connecting line of a diameter of the second light-transmitting hole and a surface central point of the lens is less than or equal to 110 degrees.

In the display device of the present disclosure, a light transmittance of the second phase retardation layer is greater than 95%.

In the display device of the present disclosure, the second phase retardation value of the second phase retardation layer is greater than or equal to 4000 nm and is less than or equal to 8000 nm.

Beneficial effect: in the present disclosure, the first phase retardation layer is disposed for protecting the display device to have stable quality. In order to overcome adverse effects of phase delay caused by the first phase retardation layer, the present disclosure further disposes the second phase retardation layer between the display functional layer and the camera module, and allows the sum of the first phase retardation value of the first phase retardation layer and the second phase retardation value of the second phase retardation layer to be greater than 8000 nm. Therefore, phase delay of natural light before reaching the camera module can be greater than 8000 nm, thereby eliminating an interference phenomenon of the natural light, preventing defects such as rainbow mura, and improving display effect.

DESCRIPTION OF DRAWINGS

The accompanying figures to be used in the description of embodiments of the present disclosure will be described in brief to more clearly illustrate the technical solutions of the embodiments. The accompanying figures described below are only a part of the embodiments of the present disclosure, from which those skilled in the art can derive further figures without making any inventive efforts.

Figure 1:
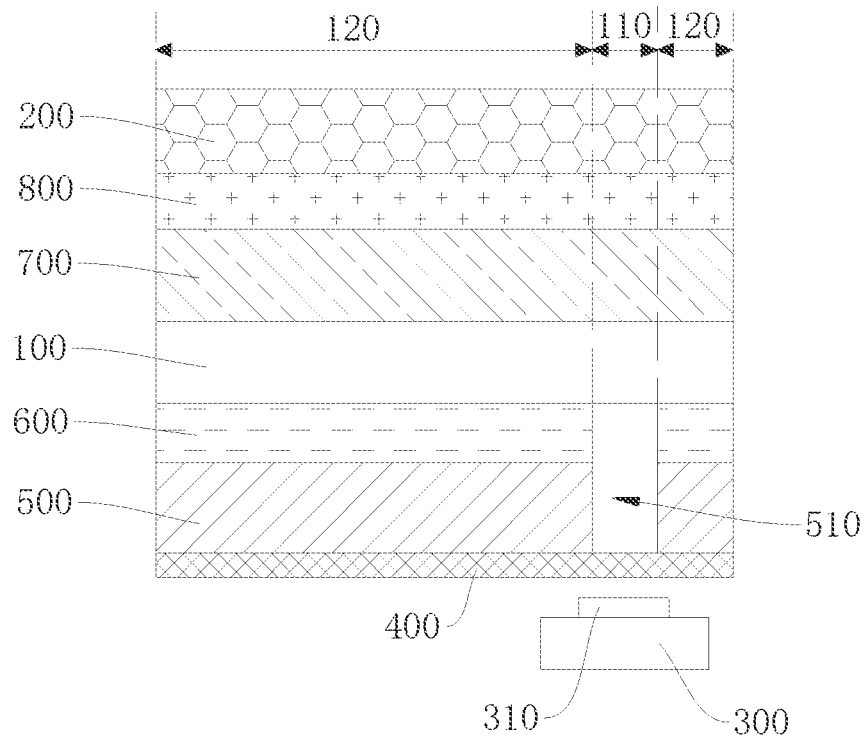
FIG. 1 is a first schematic structural diagram of a display device according to an embodiment of the present disclosure.

Elements in the drawings are designated by reference numerals listed below:

display functional layer 100; function add-on area 110; main display area 120; first phase retardation layer 200; camera module 300; lens 310; second phase retardation layer 400; second light-transmitting hole 410; substrate 500; first light-transmitting hole 510; backplate layer 600; polarizer 700; and optical adhesive layer 800.

DETAILED DESCRIPTION OF PREFERRED EMBODIMENTS

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative efforts are within the scope of the present disclosure. In addition, it should be understood that the specific embodiments described herein are only used to illustrate and explain the disclosure, and are not used to limit the disclosure. In the present disclosure, in the case of no explanation to the contrary, the orientation words used such as "on" and "under" usually refer to upper and lower directions of the device in actual use or working state, and specifically the directions in the drawings; and "inside" and "outside" refers to the outline of the device.

Camera Under Panel (CUP) technique is a main development direction of front camera techniques, which hides front lenses under screens. When taking a selfie, the screens above the front lenses turn into a transparent state, allowing sufficient light to enter. When not taking pictures, "transparent screens" can display images normally.

At present, protective films of flexible foldable screens are usually transparent organic film layer materials that can be bent, such as polyethylene terephthalate (PET) and other high phase retardation materials, which will cause incident natural light to have a phase change. In conjunction with polarizing effects of polarizers of the screens and the lenses, it is easy to cause rainbow mura when taking pictures with the lenses. In view of forgoing technical problems, the present disclosure provides following solutions.

Referring to FIGS. 1 to 6, the present disclosure provides a display device, which includes a display functional layer 100, a first phase retardation layer 200 disposed on one side of the display functional layer 100 in a light-emitting direction, a camera module 300 disposed on one side of the display functional layer 100 away from the light-emitting direction, and a second phase retardation layer 400 disposed between the display functional layer 100 and the camera module 300. The display functional layer 100 includes a function add-on area 110 and a main display area 120 surrounding the function add-on area 110, and the camera module 300 corresponds to the function add-on area 110. The first phase retardation layer 200 has a first phase retardation value, the second phase retardation layer 400 has a second phase retardation value, and a sum of the first phase retardation value and the second phase retardation value is greater than 8000 nm.

In the present disclosure, the first phase retardation layer 200 is disposed for protecting the display device to have stable quality. In order to overcome adverse effects of phase delay caused by the first phase retardation layer 200, the present disclosure further disposes the second phase retardation layer 400 between the display functional layer 100 and the camera module 300, and allows the sum of the first phase retardation value of the first phase retardation layer 200 and the second phase retardation value of the second phase retardation layer 400 to be greater than 8000 nm. Therefore, phase delay of natural light before reaching the camera module 300 can be greater than 8000 nm, thereby eliminating an interference phenomenon of the natural light, preventing defects such as rainbow mura, and improving display effect.

In this embodiment, the first phase retardation value and the second phase retardation value may also be called in-plane retardation values.

It should be noted that based on the principle of light interference, the inventors have conducted many explorations and experiments on a relationship between the interference phenomenon of the natural light and a phase retardation value, and find that when light passes through a phase retardation material which has a phase retardation value lower than 2000 nm or higher than 8000 nm, the interference phenomenon disappears. Based on the above findings, combined with the fact that a phase retardation value of protective film layers of display devices is relatively high, the present disclosure can eliminate the interference of natural light and can further prevent the defects such as rainbow mura by disposing the second phase retardation layer 400 and allowing the sum of the phase retardation value of the first phase retardation layer 200 and the phase retardation value of the second phase retardation layer 400 to be greater than 8000 nm.

Specific embodiments are used to describe technical solutions of the present disclosure. They will be described in detail in the following. It should be noted that an order of description in the following embodiments is not meant to limit a preferred order of the embodiments.

In the embodiment, the function add-on area 110 may be used to display, thereby realizing full-screen display, and the function add-on area 110 may also be used as a lighting channel to provide light for the camera module 300.

In this embodiment, the first phase retardation layer 200 may be a protective film layer with anti-scratch function, such as a polyethylene terephthalate (PET) film layer.

Referring to FIG. 1, FIG. 1 is a first schematic structural diagram of the display device according to an embodiment of the present disclosure. The display device of the present disclosure may also include a substrate 500 disposed on the side of the display functional layer 100 away from the light-emitting direction. The second phase retardation layer 400 is disposed on the substrate 500, so that it can keep the second phase retardation layer 400 and the substrate 500 relatively fixed. That is, the second phase retardation layer 400 can stably correspond to the function add-on area 110 of the display functional layer 100, thereby being able to eliminate the rainbow mura more stably.

It should be noted that in this embodiment, since the second phase retardation layer 400 is disposed on one side of the substrate 500 away from the display functional layer 100, there is no need to insert a new layer of independent film into a stacked structural module of the display device. Therefore, it can reduce the process difficulty of setting the second phase retardation layer 400, and can also achieve a good effect of eliminating the rainbow mura at a same time.

Referring to FIG. 1, in this embodiment, the display device may further include a buffer layer (not shown in the figure) disposed on the substrate 500, a backplate layer 600 disposed on the buffer layer, a polarizer 700 disposed on a light-emitting side of the display functional layer 100, and an optical adhesive layer 800 disposed on the polarizer 700. Wherein, the buffer layer and the backplate layer 600 are located on the side of the display functional layer 100 away from the light-emitting direction and between the substrate 500 and the display functional layer 100. The first phase retardation layer 200 is disposed on the optical adhesive layer 800.

In this embodiment, the substrate 500, the backplate layer 600, and the display functional layer 100 together constitute a display panel, and the display panel may be a flexible panel or a rigid panel.

In this embodiment, when the display panel is a rigid panel, a material of the substrate 500 may be glass, stainless steel sheets, copper foils, other metal sheets, alloy sheets, etc.

In this embodiment, when the display panel is a flexible panel, the material of the substrate 500 may be a multi-layer laminate structure material, such as polyimide (PI), polyethylene terephthalate (PET), ultra-thin glass, or polymer/nano inorganics, or may also be glass, stainless steel sheets, copper foils, other metal sheets, or alloy sheets, etc. If the flexible panel needs to be bent or folded, the substrate 500 of the flexible panel needs to be patterned in a bending area.

In this embodiment, the buffer layer may be prepared from a soft film layer material, such as an ultra-clean foam material or a rubber foam material.

In this embodiment, the backplate layer 600 may be a flexible support material or a polyimide (PI) material.

In this embodiment, the polarizer 700 may be composed of a polyvinyl alcohol (PVA) material layer, a tricellulose acetate (TAC) material layer, a pressure-sensitive adhesive layer, a release film layer, and a protective film layer.

In this embodiment, the optical adhesive layer 800 may be prepared from materials such as silicone rubber, acrylic resin, unsaturated polyester, polyurethane, or epoxy resin.

Referring to FIG. 1, in the display device of the present disclosure, an orthographic projection of the second phase retardation layer 400 on the substrate 500 coincides with the substrate 500, and an orthographic projection of the substrate 500 on the second phase retardation layer 400 coincides with the second phase retardation layer 400. That is, the second phase retardation layer 400 may be set on entire surface of the substrate 500. That is, the second phase retardation layer 400 can completely cover the substrate 500, so that a manufacturing process of the second phase retardation layer 400 is relatively simple, and it is easy for alignment, thereby effectively reducing the process difficulty and cost.

Figure 2:
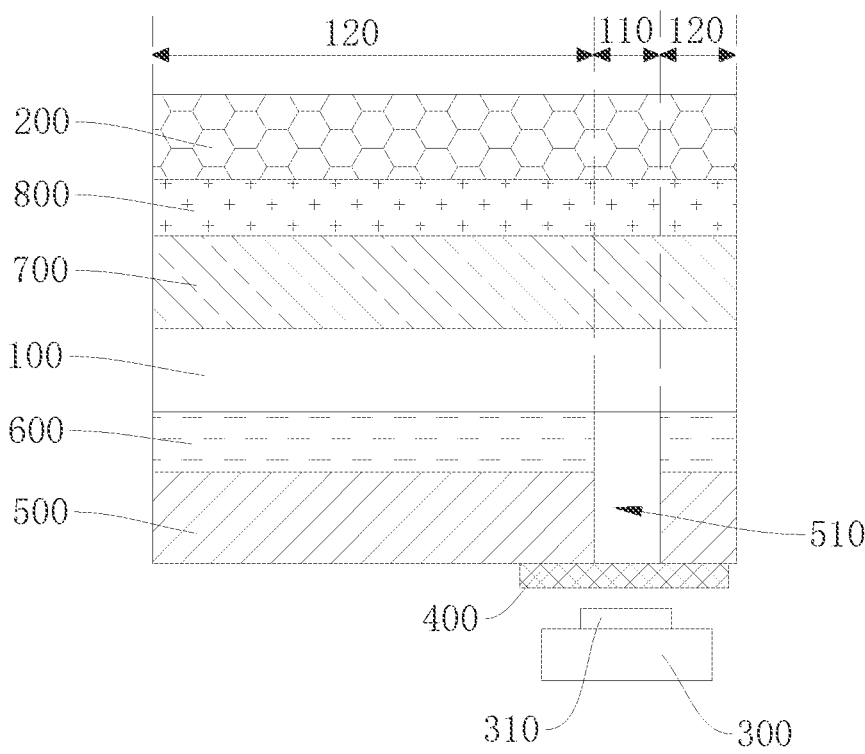
FIG. 2 is a second schematic structural diagram of the display device according to an embodiment of the present disclosure.

Referring to FIG. 2, FIG. 2 is a second schematic structural diagram of the display device according to an embodiment of the present disclosure. In this embodiment, the second phase retardation layer 400 may correspond to the function add-on area 110. That is, the second phase retardation layer 400 may be disposed only in a partial area of the substrate 500 corresponding to the function add-on area 110, thereby saving material cost of the second phase retardation layer 400.

In this embodiment, an orthographic projection of the function add-on area 110 on the second phase retardation layer 400 is within the second phase retardation layer 400. Therefore, the second phase retardation layer 400 can fully retard all natural light incident in the function add-on area 110, thereby preventing or reducing a phenomenon of "light leakage". It should be noted that in this embodiment, the phenomenon of "light leakage" can be understood as that the natural light incident into the function add-on area 110 does not pass through the second phase retardation layer 400 but directly enters the camera module 300.

Figure 3:
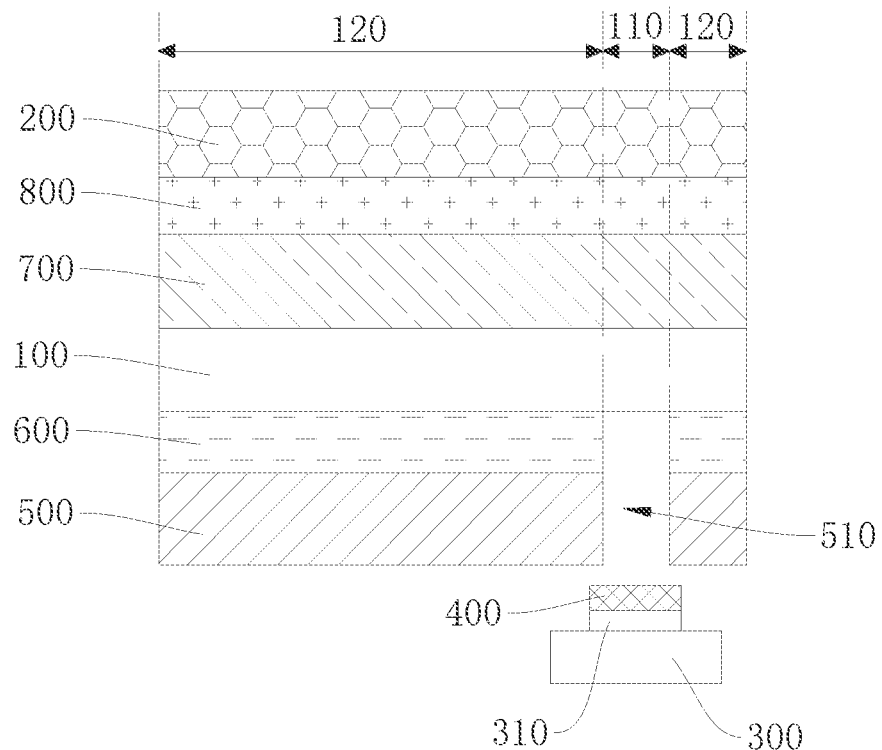
FIG. 3 is a third schematic structural diagram of the display device according to an embodiment of the present disclosure.

Referring to FIG. 3, FIG. 3 is a third schematic structural diagram of the display device according to an embodiment of the present disclosure. In the display device of the present disclosure, the second phase retardation layer 400 may be disposed on the camera module 300, and the orthographic projection of the function add-on area 110 on the second phase retardation layer 400 is within the second phase retardation layer 400. In this embodiment, since the second phase retardation layer 400 is disposed on the camera module 300, it can further play a phase delay effect on the natural light, and the second phase retardation layer 400 can be aligned with the function add-on area 110 of the display functional layer 100 when the camera module 300 is aligned with the function add-on area 110. That is, a process step of aligning the second phase retardation layer 400 with the function add-on area 110 can be omitted, thereby simplifying the processes of the display device and improving production efficiency.

Figure 4:
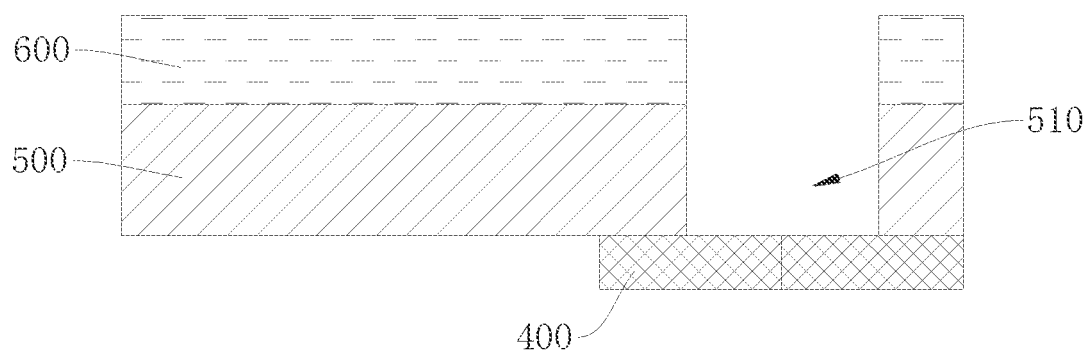
FIG. 4 is a first schematic structural diagram of a second phase retardation layer according to an embodiment of the present disclosure.

Referring to FIG. 4, FIG. 4 is a first schematic structural diagram of the second phase retardation layer 400 according to an embodiment of the present disclosure. In the display device of the present disclosure, the substrate 500 is provided with a first light-transmitting hole 510 corresponding to the function add-on area 110. An orthographic projection of the first light-transmitting hole 510 on the display functional layer 100 is within the function add-on area 110. In this embodiment, the first light-transmitting hole 510 penetrates the substrate 500 and the backplate layer 600 along the light-emitting direction of the display functional layer 100, so the natural light incident into the function add-on area 110 can pass through the first light-transmitting hole 510 and directly reach the camera module 300, thereby improving a lighting rate of the camera module 300.

Figure 5:
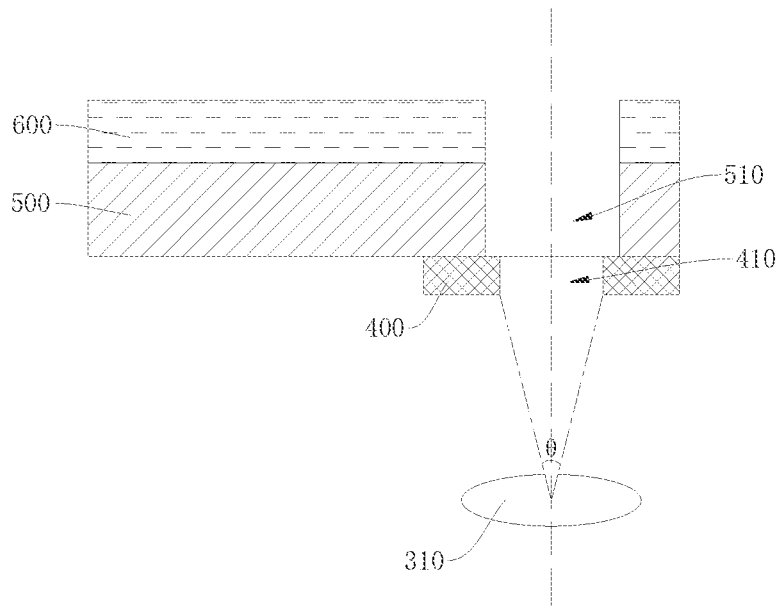
FIG. 5 is a second schematic structural diagram of the second phase retardation layer according to an embodiment of the present disclosure.

Referring to FIG. 5, FIG. 5 is a second schematic structural diagram of the second phase retardation layer 400 according to an embodiment of the present disclosure. In this embodiment, the second phase retardation layer 400 is provided with a second light-transmitting hole 410 corresponding to the first light-transmitting hole 510. The second light-transmitting hole 410 can reduce a light interception effect of the second phase retardation layer 400 to a certain degree, thereby further improving the lighting rate of the camera module 300.

Figure 6:
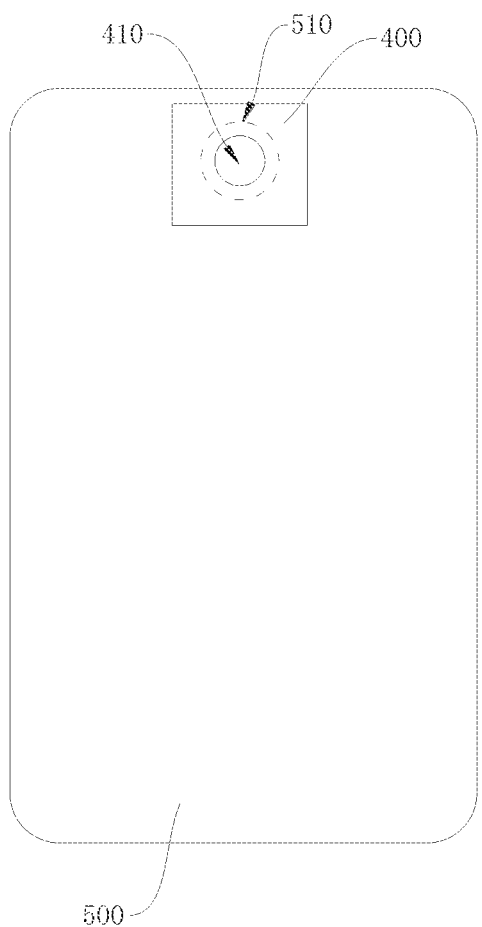
FIG. 6 is a schematic diagram of a bonding position of the second phase retardation layer and a substrate according to an embodiment of the present disclosure.

Referring to FIG. 6, FIG. 6 is a schematic diagram of a bonding position of the second phase retardation layer 400 and the substrate 500 according to an embodiment of the present disclosure. In this embodiment, shapes of the first light-transmitting hole 510 and the second light-transmitting hole 410 may be a circle, a square, a regular hexagon, or other shapes. Preferably, the shapes of the first light-transmitting hole 510 and the second light-transmitting hole 410 may be both circular or square. A shape of the second phase retardation layer 400 may be a circle, a rectangle, a square, a regular hexagon, or other shapes, as long as it can completely cover the second light-transmitting hole 410 and the first light-transmitting hole 510.

Referring to FIG. 5, in the display device of the present disclosure, the camera module 300 includes a lens 310 corresponding to the second light-transmitting hole 410. A central line of the second light-transmitting hole 410 coincides with a central line of the first light-transmitting hole 510, and a diameter of the second light-transmitting hole 410 is less than a diameter of the first light-transmitting hole 510.

In this embodiment, the alignment of the second light-transmitting hole 410 and the first light-transmitting hole 510 can be more precise by allowing the central line of the second light-transmitting hole 410 to be coincide with the central line of the first light-transmitting hole 510. The diameter of the second light-transmitting hole 410 being less than the diameter of the first light-transmitting hole 510 will reduce a light transmittance in the function add-on area 110 of the display device to a certain degree, but it can play a masking role on the natural light incident on an edge position of the function add-on area 110 (that is, adjusting an incident angle of the natural light). Therefore, problems of strong Brewster effect and serious rainbow mura caused by a larger incident angle of the natural light at an edge of the lens 310 of the camera module 300 can be alleviated or solved.

It should be noted that the Brewster effect can be understood as: when a beam of light is projected on an interface of two media (such as air and glass), if a tangent of an incident angle α (tan α) of the light in a first medium (such as air) is equal to a relative refractive index (that is, a ratio of a refractive index n2 of the glass to a refractive index n1 of the air) of a second medium (such as glass), then reflected light becomes fully linearly polarized light, while refracted light is still partially polarized light, and the incident angle at this time is called "Brewster angle" or a polarization angle.

In this embodiment, the first medium may be the air in the function add-on area 110, and the second medium may be the lens 310 of the camera module 300. The natural light is incident on the interface between the air and the lens 310. If the second phase retardation layer 400 is not disposed or the diameter of the second light-transmitting hole 410 is greater than or equal to the first light-transmitting hole 510, the incident angle of the natural light may be the polarization angle. At this time, the reflected light is completely linearly polarized light, and a light interference phenomenon will occur, thereby generating rainbow mura. It should be noted that the light interference phenomenon has formation conditions: only two coherent light sources with a same frequency, a constant phase difference, and a same vibration direction can generate light interference. Light emitted by two ordinary and independent light sources cannot have the same frequency, nor a fixed phase difference, so there is no interference phenomenon between them.

Referring to FIG. 5, in the display device of the present disclosure, a central line of the lens 310 coincides with the central line of the second light-transmitting hole 410. Therefore, the alignment of the lens 310 with the second light-transmitting hole 410 and the first light-transmitting hole 510 can be more precise, thereby improving the lighting rate.

In this embodiment, an included angle θ formed by a connecting line of the diameter of the second light-transmitting hole 410 and a surface central point of the lens 310 is greater than or equal to 90 degrees. The included angle θ is an actual viewing angle of the lens 310 when the natural light does not pass through the second phase retardation layer 400 (that is, the natural light passes through the second light-transmitting hole 410). When the actual viewing angle of the lens 310 is greater than or equal to 90 degrees, a wider photographing range can be obtained.

In this embodiment, the actual viewing angle of the lens 310 can be understood as: one vertical plane passing through the central line of the second light-transmitting hole 410 is taken as a central symmetry plane, two points on edge positions of one side of the second light-transmitting hole 410 adjacent to the camera module 300 are taken, the two points are symmetrical about the central symmetry plane, and the actual viewing angle of the lens 310 is an included angle formed by the two points and a central point of the lens 310.

It should be noted that in current display devices, a viewing angle of the lens 310 of the camera module 300 in an ultra-wide-angle mode usually ranges from 110 degrees to 120 degrees. In this embodiment, due to the shielding effect of the second phase retardation layer 400, the actual viewing angle θ of the lens 310 is less than a viewing angle of a general lens 310.

Therefore, in this embodiment, the included angle θ formed by the connecting line of the diameter of the second light-transmitting hole 410 and the surface central point of the lens 310 may range from 90 degrees to 110 degrees. That is, the included angle θ is greater than or equal to 90 degrees and is less than or equal to 110 degrees. Therefore, it can ensure that no rainbow mura can be seen under the actual viewing angle of the lens 310, and the photographing effect can be further improved. Further, preferably, the included angle θ formed by the connecting line of the diameter of the second light-transmitting hole 410 and the surface central point of the lens 310 may be set as 90 degrees to eliminate the defects of the rainbow mura as much as possible.

In the display device of the present disclosure, a light transmittance of the second phase retardation layer 400 is greater than 95%. Therefore, the light-shielding effect of the second phase retardation layer 400 can be reduced as much as possible, and the light transmittance of the display device can be improved.

In this embodiment, the second phase retardation value of the second phase retardation layer 400 is set to be greater than or equal to 4000 nm and less than or equal to 8000 nm to be adapted to the first phase retardation value of the first phase retardation layer 200. Therefore, the sum of the first phase retardation value and the second phase retardation value is always greater than or equal to 8000 nm, thereby ensuring that the rainbow mura can be completely eliminated, and display and photographing quality can be stable.

Since a phase retardation value of phase retardation film layer materials increases as a thickness thereof increases, in this embodiment, a thickness of the second phase retardation layer 400 also needs to be limited. In this embodiment, in the light-emitting direction of the display functional layer 100, the thickness of the second phase retardation layer 400 may range from 30 μm to 50 μm, thereby allowing the phase retardation value of the second phase retardation layer 400 to satisfy usage requirements.

The display device provided in the embodiments of the present disclosure is described in detail above. Specific examples are used herein to explain the principles and implementation of the present disclosure. The descriptions of the above embodiments are only used to help understand the method of the present disclosure and its core ideas; meanwhile, for those skilled in the art, the range of specific implementation and application may be changed according to the ideas of the present disclosure. In summary, the content of the specification should not be construed as causing limitations to the present disclosure.

What is claimed is:

1. A display device, comprising:
   a display functional layer comprising a function add-on area and a main display area surrounding the function add-on area;
   a first phase retardation layer disposed on one side of the display functional layer in a light-emitting direction;
   a camera module disposed on one side of the display functional layer away from the light-emitting direction, wherein the camera module corresponds to the function add-on area;
   a substrate disposed on the side of the display functional layer away from the light-emitting direction, wherein the substrate is provided with a first light-transmitting hole corresponding to the function add-on area; and
   a second phase retardation layer disposed between the display functional layer and the camera module, wherein the second phase retardation layer is disposed on the substrate, and the second phase retardation layer is provided with a second light-transmitting hole corresponding to the first light-transmitting hole;
   wherein the first phase retardation layer has a first phase retardation value, the second phase retardation layer has a second phase retardation value, and a sum of the first phase retardation value and the second phase retardation value is greater than 8000 nm.

2. The display device according to claim 1, wherein the second phase retardation layer is disposed on the substrate.

3. The display device according to claim 2, wherein the second phase retardation layer corresponds to the function add-on area.

4. The display device according to claim 3, wherein an orthographic projection of the function add-on area on the second phase retardation layer is within the second phase retardation layer.

5. The display device according to claim 1, wherein an orthographic projection of the second phase retardation layer on the substrate coincides with the substrate.

6. The display device according to claim 5, wherein an orthographic projection of the substrate on the second phase retardation layer coincides with the second phase retardation layer.

7. The display device according to claim 1, wherein the second phase retardation layer is disposed on the camera module.

8. The display device according to claim 7, wherein an orthographic projection of the function add-on area on the second phase retardation layer is within the second phase retardation layer.

9. The display device according to claim 1, wherein an orthographic projection of the first light-transmitting hole on the display functional layer is within the function add-on area.

10. The display device according to claim 1, wherein a central line of the second light-transmitting hole coincides with a central line of the first light-transmitting hole.

11. The display device according to claim 10, wherein a diameter of the second light-transmitting hole is less than a diameter of the first light-transmitting hole.

12. The display device according to claim 1, wherein the camera module comprises a lens corresponding to the second light-transmitting hole.

13. The display device according to claim 12, wherein a central line of the lens coincides with a central line of the second light-transmitting hole.

14. The display device according to claim 13, wherein an included angle formed by a connecting line of a diameter of the second light-transmitting hole and a surface central point of the lens is greater than or equal to 90 degrees.

15. The display device according to claim 12, wherein an included angle formed by a connecting line of a diameter of the second light-transmitting hole and a surface central point of the lens is less than or equal to 110 degrees.

16. The display device according to claim 1, wherein a light transmittance of the second phase retardation layer is greater than 95%.

17. The display device according to claim 1, wherein the second phase retardation value of the second phase retardation layer ranges from 4000 nm to 8000 nm.

* * * * *